| | |
|---|---|
| **United States Patent** [19] | [11] **Patent Number: 4,988,559** |
| **Nemoto et al.** | [45] **Date of Patent: Jan. 29, 1991** |

[54] SUPPORT SHEET FOR PHOTOGRAPHIC PRINTING SHEET

[75] Inventors: Hiroyuki Nemoto; Masahiro Kamiya; Tsunehisa Shigetani, all of Tokyo, Japan

[73] Assignee: Oji Paper Co., Ltd., Tokyo, Japan

[21] Appl. No.: 433,100

[22] Filed: Nov. 8, 1989

[30] Foreign Application Priority Data

Nov. 15, 1988 [JP] Japan .................................. 63-286789

[51] Int. Cl.[5] ............................................. B32B 27/32

[52] U.S. Cl. .................................... 428/219; 428/340; 428/342; 428/508; 428/511; 428/513; 430/530; 427/439; 264/177.18

[58] Field of Search ............... 428/513, 511, 508, 340, 428/342, 219

[56] References Cited

U.S. PATENT DOCUMENTS 4,731,291 3/1988 Kerkhoff et al. .................. 428/513

FOREIGN PATENT DOCUMENTS 61-34659 8/1986 Japan .

*Primary Examiner*—P. C. Sluby
*Attorney, Agent, or Firm*—Armstrong, Nikaido, Marmelstein, Kubovcik & Murray

[57] ABSTRACT

A support sheet for photographic printing paper comprising a substrate sheet, polyolefin resin coating layers formed on the two surfaces of the substrate sheet, and an adhesive layer formed on a surface of the substrate sheet and one of the coating layers and comprising hydroxyethyl cellulose or a mixture of hydroxyethyl cellulose with one or more organic compounds having carboxyl radicals, the adhesive layer enabling the peel strength of the coating layer from the substrate sheet surface to be controlled to an appropriate peelable level of 10 to 200 g/25.4 mm determined in accordance with ASTM D903-49.

14 Claims, No Drawings

SUPPORT SHEET FOR PHOTOGRAPHIC PRINTING SHEET

BACKGROUND OF THE INVENTION

1. Field of the Invention

The present invention relates to a support sheet for photographic printing paper. More particularly, the present invention relates to a support sheet for photographic printing paper, in which the peel strength between a substrate sheet and a polyolefin resin coating layer formed on a surface of the substrate sheet is controlled to an appropriate level for peeling or stripping.

2. Description of the Related Arts

A conventional photographic printing paper (hereinafter referred to as "photographic paper") has a multiple layer structure comprising a substrate sheet, a polyethylene resin layer, containing a light-reflecting substance, coated on one surface of the substrate sheet, a photographic emulsion layer formed on the polyethylene resin layer, and another coating layer, comprising a polyethylene resin, formed on the opposite surface of the substrate sheet. A photographic paper having an undercoat layer formed between the polyethylene resin layer and the photographic emulsion layer for improving the adhesion between the two layers is known. The photographic paper as mentioned above is printed and developed, and colored or black-and-white images are formed on the photographic emulsion layer of the photographic paper. The images recorded on the photographic emulsion layer can be clearly observed due to the light reflection off the light-reflecting substance, for example, titanium dioxide ($TiO_2$) particles, contained in the polyethylene resin layer, and on the substrate sheet surface.

In various uses, the printed and developed photographic paper sheets are adhered to a notebook, a book, a desk, a show-window, a post card or other article, and utilized for display and advertisement. Accordingly, a development of a new type of photographic paper suitable for the above-mentioned use is desired.

In conventional photographic paper sheets as mentioned above, a thick paper sheet is used as a substrate sheet to prevent a breaking or bending thereof, and therefore, when the printed and developed photographic paper sheet is adhered to a notebook, a book, a desk, a show-window, a post card or other article as a sticker or seal, the thickness of the resultant photographic print-bonded article is greatly increased, or it becomes difficult to firmly adhere the entire surface of the photographic print to the article because the support sheet has curled. As a general attempt to solve this problem, a reduction of the thickness of the substrate sheet in the support sheet for the photographic paper has been considered. In this case, however, the stiffness of the photographic paper is lessened and the curl balance thereof is lost, and thus it cannot be used in the conventional photographic developing apparatuses.

Even if an attempt is made to use a special thin paper sheet as a support sheet for the photographic paper, this attempt will be disadvantageous from the practical and economical viewpoints.

The conventional photographic paper sheet consists of a substrate sheet, polyolefin resin coating layers formed on the surfaces of the substrate sheet, and a photographic emulsion layer formed an one of the coating layers. Therefore attempts have been made to provide a photographic paper sheet in which the photographic emulsion layer can be peeled from the substrate sheet together with the polyolefin resin coating layer located thereunder, by utilizing the above-mentioned structure to eliminate the disadvantages of the conventional photographic paper.

That is, Japanese Unexamined Patent Publication No. 54-92219 discloses that, in a process for the preparation of a support sheet for a photographic printing paper, lamination conditions at the step of coating the substrate sheet with a polyolefin resin containing a light-reflecting substance are appropriately selected and controlled, so that the adhere strength between the substrate sheet and the polyolefin resin coating layer is appropriately controlled, and the photographic emulsion layer in the photographic paper can be easily peeled, together with the polyolefin resin coating layer, from the substrate sheet.

In this attempt, however, slight variations in the conditions when preparing the support sheet for the photographic paper, result in variations in peel strength between the substrate sheet and the polyolefin resin coating layer, and it is difficult to maintain this peel strength at a constant value. Therefore, it is practically difficult to obtain a photographic paper in which the photographic emulsion layer can be peeled together with the polyolefin resin coating layer from the substrate sheet, if necessary.

SUMMARY OF THE INVENTION

An object of the present invention is to provide a support sheet for photographic printing paper, in which the peel strength between a substrate sheet and a polyolefin resin coating layer is maintained at a predetermined level, and both layers can be easily peeled from each other when necessary.

The above-mentioned object can be attained by the support sheet of the present invention for photographic printing paper, which comprises a substrate sheet; coating layers formed on two surfaces of the substrate sheet comprising, as a main component, a polyolefin resin; and an adhesive layer, formed between a surface of the substrate sheet and one of the coating layers formed on the surface of the substrate sheet, comprising, as a main component, a member selected from the group consisting of hydroxyethyl cellulose and mixtures of hydroxyethyl cellulose and at least one organic compound having a carboxyl group.

Preferably, the adhesive layer enables the peel strength between the substrate sheet surface and the coating layer to be controlled to a predetermined level of from 10 to 200 g/25.4 mm, determined in accordance with ASTM D-903-49.

DESCRIPTION OF THE PREFERRED EMBODIMENTS

Generally, a peel strength of from 10 to 200 g/25.4 mm, preferably 30 to 100 g/25.4 mm, between the substrate sheet and the coating layer in a photographic paper is satisfactory for practical use.

If the peel strength is less than 10 g/25.4 mm, at the steps of coating the support sheet surface with a photographic emulsion, and of printing and developing the photographic paper sheet, the coating layer in the photographic paper sheet is easily interlaminately stripped from the substrate sheet.

If the peel strength is more than 200 g/25.4 mm, it is practically difficult to strip the coating layer from the substrate sheet.

This specific peel strength of from 10 to 200 g/25.4 mm of the coating layer from the substrate sheet can be attained by forming an adhesive layer comprising, as a main component, a member selected from the group consisting of hydroxyethyl cellulose and mixtures of hydroxyethyl cellulose and at least one organic compound having carboxyl groups, between the substrate sheet and the polyolefin resin coating layer. In the mixtures, the mixing ratio in weight of the hydroxyethyl cellulose to the carboxyl group-containing organic compound is preferably in the range of from 2:8 to 8:2.

This specific adhesive layer of the present invention effectively holds the polyolefin resin coating layer firmly fixed to the substrate sheet at an adhering strength sufficiently high that stripping of the coating layer from the substrate sheet is prevented during the coating and drying steps of the photographic emulsion on the support sheet to prepare a photographic paper, and developing step of the photographic paper, and that the polyolefin resin coating layer can be stripped from the substrate sheet without difficulty when needed.

Also, the adhesive layer of the present invention comprising, as a main component, hydroxyethyl cellulose does not cause a reduction in whiteness of the resultant support sheet for the photographic paper. Even when the photographic paper sheet is immersed in a developing solution or a bleach-fix solution so that cut edge faces of the photographic paper sheet come into contact with the solution, the adhesive layer does not allow the solution to penetrate between the substrate sheet and the polyolefin resin coating layer and to strip the polyolefin resin coating layer from the substrate sheet.

The hydroxyethyl cellulose in the adhesive layer does not affect the photographic sensitivity and other photographic properties of the photographic emulsion layer, and does not causes an indesirable fogging of the photographic emulsion layer.

Commercially available hydroxyethyl cellulose can be used to provide the adhesive layer in the present invention. Generally, hydroxyethyl cellulose having a degree of substitution of the hydroxyethyl group of 1.0 to 1.5 on each glucose unit, an average gram molecule of the substituted hydroxyethyl groups of 1.5 to 2.5, and a molecular weight of 30,000 to 250,000 is preferably employed for the present invention.

The organic compounds having a carboxyl radical, usable for the present invention are available on the commercial market are preferably selected from carboxy-modified polyvinylalcohols, carboxy-modified styrene-butadiene copolymers, carboxy-modified acrylic acid polymers, carboxy-modified acrylic ester polymers and oxidized starch. Most preferable compounds are carboxy-modified polyvinylalcohols.

The carboxy-modified polyvinylalcohols preferably contain 1 to 20 molar % of carboxyl groups and have a molecular weight of 40,000 to 130,000.

The adhesive layer of the present invention preferably comprises 95% by weight of hydroxyethyl cellulose or the mixture of hydroethyl cellulose and the carboxyl group-having organic compound, and optionally, up to 5% by weight of an additive, such as a coating property improver or a defoaming agent.

The amount of the adhesive layer of the present invention is not restricted to a specific range, as long as the above-mentioned specific peel strength is attained. Generally, the adhesive layer of the present invention is preferably in an amount of 0.05 to 5 g/m$^2$.

If the amount of the adhesive layer is less than 0.05 g/m$^2$, sometimes the peel strength between the substrate sheet and the coating layer becomes excessively high, and if the amount of the adhesive layer exceeds 5 g/m$^2$, sometimes the peel strength is too small and the cost is increased, and thus the resultant photographic paper is practically disadvantageous.

The adhesive layer of the present invention can be formed by a usual coating method, such as an air knife coating, blade coating, bar coating, gravure coating or die coating method. Otherwise, the adhesive layer of the present invention can be formed by immersing the substrate sheet in a solution of the material for the adhesive layer, and removing an excessive amount of the solution by using a pair of squeezing rolls, in a size-press method.

The substrate sheet usable for the present invention is not limited to specific paper sheets made from specific type of wood pulps and preferably selected from paper sheets made from softwood pulp, hardwood pulp, and mixtures of softwood pulp and hardwood pulp. Also, the wood pulps are not limited to specific pulps made by specific pulping methods, and kraft pulp, sulfite pulp, and soda pulp, as usually used for paper sheets, can be utilized as the substrate sheet of the present invention. Further, if necessary, a synthetic pulp and a blend pulp containing synthetic fibers can be employed for the substrate sheet of the present invention.

There is no restriction on the type and thickness of the substrate sheet, but the substrate sheet preferably possesses a high surface smoothness enhanced by applying a compressive force to the substrate sheet by a calender, and has a basis weight of from 50 to 250 g/m$^2$ and a thickness of 50 to 250 $\mu$m.

The paper sheets usable for the substrate sheet of the present invention may contain at least one member selected from various paper additives, for example, dry paper strength reinforcers (for example, cationic starches, cationic polyacrylamides and anionic polyacrylamides), sizing agents (for example, fatty acid salts, rosin, maleic acid-modified resins, cationic sizing agents and reactive sizing agents), fillers (for example, clay, talc and kaolin), wet paper strength reinforcers (for example, melamine-formaldehyde resins and epoxidized polyamide resins), fixing agents (for example, aluminum sulfate and cationized starches), and pH-adjusting agents (for example, caustic soda and sodium carbonate). The paper sheet can be tubsized or size-pressed by a treating liquid containing at least one member selected from a water-soluble polymeric additive, a sizing agent, an inorganic electrolyte, a hygroscopic substance, a pigment, and a pH-adjusting agent, polyvinyl alcohol and carboxy-modified polyvinyl alcohol.

The polyolefin resin usable for coating both the surfaces of the substrate sheet therewith in the support sheet of the present invention is selected from, for example, homopolymers of ethylene and $\alpha$-olefins, for example, propylene, copolymers of at least two of the foregoing olefins and mixtures of at least two of these polymers. Low-density polyethylene resins, high-density polyethylene resins, linear low density polyethylene resins, and a mixture thereof are especially preferable for the coating layers of the present invention. The molecular weight of the polyolefin resin is not particularly critical, but a polyolefin resin having a molecular weight of 20,000 to 200,000 is generally used. Each coating layer is formed in an amount of 10 to 50 g/m$^2$, preferably 20 to 40 g/m$^2$ on the substrate sheet.

Low-density polyethylene resins, high-density polyethylene resins or mixtures of low-density polyethylene and high-density polyethylene resins are generally used for coating the back surface (opposite to the surface on which the photographic emulsion layer is formed). In the coating procedure, the polyolefin resin is melted and extrusion-coated on a substrate sheet surface. This back surface coating layer is usually matted.

The polyolefin resin usable for coating the front surface of the substrate sheet, on which surface the photographic emulsion layer is formed, is preferably mixed with a white pigment, for example, titanium dioxide. Optionally, another additive consisting of at least one member selected from, for example, colored pigments, fluorescent brightening agents, antioxidants, and dispersing agents, may be admixed with the polyolefin resin.

In the formation of the coating layers on the front and back surfaces of the substrate sheet the density of the front polyolefin resin coating layer is preferably controlled to a level slightly lower than that of the back polyolefin resin coating layer, or the amount of the back polyolefin resin coating layer is adjusted to a level more than that of the front polyolefin resin coating layer, to increase the flatness of the photographic paper sheet in a normal usage environment after the developing.

Generally, the front or back polyolefin resin coating layers is formed by coating the front or back surface of the substrate sheet with polyolefin resin compositions, by a melt-extrusion laminating method.

In the melt-extrusion laminating procedures, a polyolefin resin composition in melted in the extruder, and the melt is extruded in a single filmy stream or a plurality of filmy streams through a slit die of the extruder, onto a surface of a substrate sheet which is continuously forwarded along a coating path at a constant speed. Usually, the melt-extruding temperature for the polyolefin resin is preferably in the range of from 250° C. to 350° C.

When a polyolefin resin coating layer is formed on an adhesive layer, and the resultant coating layer must be stripped from the substrate sheet during the use of the resultant photographic paper sheet, preferably a polyolefin resin melt is applied to the adhesive layer without applying a corona discharge treatment or flame treatment to the adhesive layer surface.

Nevertheless, a surface of the substrate sheet to which a polyolefin resin coating layer must be firmly fixed without stripping, throughout usage of the resultant photographic paper sheet, is preferably activated by the corona discharge treatment or flame treatment before the polyolefin resin melt is coated on the surface of the substrate sheet, to enhance the bonding of the substrate sheet surface to the polyolefin resin.

Also, before applying a photographic emulsion, a surface of a polyolefin resin coating layer in the support sheet of the present invention is preferably activated by the corona discharge treatment or flame treatment.

Further, if necessary, an undercoat layer is formed on the polyolefin resin coating layer to enhance the bonding strength of the coating layer surface to the photographic emulsion layer.

Furthermore, a backcoat layer may be formed on the surface of the back polyolefin resin coating layer to enhance the printing, writing, and antistatic properties of the back coating layer surface.

EXAMPLE

The present invention will be further described in detail with reference to the following examples that do not in any way limit the scope of the invention.

Examples 1 through 9 and Comparative Examples 1 through 6

In each of Examples 1 through 9 and Comparative Examples 1 through 6, a wood free paper sheet having a basis weight of 170 g/m$^2$ was used as a substrate sheet and one surface thereof was subjected to a corona discharge treatment. Then, a coating layer having a thickness of 27 microns was formed on that substrate sheet surface by a melt-extrusion laminating method using a polyethylene resin having a density of 0.942 and a melt index (MI) of 8. An adhesive layer as shown in Table 1 was formed on the opposite surface of the wood free paper and a coating layer having a thickness of 27 microns was formed on the adhesive layer by a melt extrusion laminating method at a resin temperature of 330° C., from a polyethylene resin composition comprising a polyethylene resin having a density of 0.936 and a melt index (MI) of 7 and containing 10% by weight of titanium dioxide.

In the resultant support sheet for a photographic printing paper prepared by the above-mentioned method, the peel strength between the wood free paper sheet and the coating layer on the front surface side thereof was determined according to the test method of ASTM D-903. The results are shown in Table 1.

TABLE 1

| | Item | | | |
|---|---|---|---|---|
| | Adhesion layer | | | Peel strength**** between substrate sheet and coating layer (g/25.4 mm) |
| Example No. | Composition | Mixing ratio in weight | Coating weight (g/m$^2$) | |
| Example | | | | |
| 1 | Hydroxyethyl cellulose* | — | 0.1 | 150 |
| 2 | " | — | 0.3 | 80 |
| 3 | " | — | 0.5 | 50 |
| 4 | Mixture of hydroxyethyl cellulose and carboxy-modified polyvinyl alcohol** | 6:3 | 0.2 | 150 |
| 5 | Mixture of hydroxyethyl cellulose and carboxy- | 6:3 | 0.4 | 80 |

TABLE 1-continued

| Example No. | Item: Adhesion layer: Composition | Mixing ratio in weight | Coating weight ($g/m^2$) | Peel strength**** between substrate sheet and coating layer (g/25.4 mm) |
|---|---|---|---|---|
| | modified polyvinyl alcohol** | | | |
| 6 | Mixture of hydroxyethyl cellulose and carboxy-modified polyvinyl alcohol** | 6:3 | 0.6 | 50 |
| 7 | Mixture of hydroxyethyl cellulose and carboxy-modified polyvinyl alcohol** | 5:5 | 0.4 | 90 |
| 8 | Mixture of hydroxyethyl cellulose and carboxy-modified polyvinyl alcohol** | 3:6 | 0.4 | 100 |
| 9 | Mixture of hydroxyethyl cellulose and oxidized starch*** | 6:3 | 0.4 | 110 |
| Comparative Example | | | | |
| 1 | None | — | 0. | 300 |
| 2 | Hydroxyethyl cellulose | — | 0.01 | 250 |
| 3 | " | — | 10 | <10 |
| 4 | Mixture of hydroxyethyl cellulose and carboxy-modified polyvinyl alcohol | 6:3 | 0.01 | 270 |
| 5 | Mixture of hydroxyethyl cellulose and carboxy-modified polyvinyl alcohol | 6:3 | 10 | <10 |
| 6 | Oxidized starch | — | 1 | 350 |

Note
*Trademark: Hujiheck Al-15F, from Fuji Chemical Co.
**Trademark: Gosenol T-330H, from Nihon Gosei Kagaku Kogyo K. K.
***Trademark: Ace A, from Oji Cone Starch Co.
****Trademark: peel strength of from 10 to 200 g/25.4 mm is suitable for practical use.

As apparent from the results shown in Table 1, the resultant support sheets of the present invention in Examples 1 through 9 wherein the adhesive layers comprise hydroxyethyl cellulose or mixtures of hydroxyethyl cellulose with carboxy-modified polyvinyl alcohol or oxidized starch, had peel strengths suitable for practical!l application, but where the adhesive layer was not formed (Comparative Example 1), the coating weight of the adhesive layer was too small (Comparative Examples 2 and 4) or a substance different from hydroxyethyl cellulose was coated (Comparative Example 6), the peel strength between the substrate sheet and the polyolefin resin coating layer was too high, and thus the resultant support sheet was not suitable for practical use in which the coating layer is required to be stripped from the substrate sheet. Also, when the coating weight of the adhesive layer is excessively large (Comparative Examples 3 and 5), the peel strength between the substrate sheet and the polyolefin resin coating layer is too low, and thus the resultant support sheet cannot be used for the photographic paper.

According to the present invention, the peel strength between a polyolefin resin coating layer and a substrate sheet can be controlled to an appropriate peelable level, and the support sheet for a photographic printing paper that can be applied to various uses where stripping of the coating layer is necessary, can be provided.

We claim:

1. A support sheet for photographic printing paper comprising:

a substrate sheet comprising a paper sheet;

coating layers formed on the two principal surfaces of the substrate sheet comprising a polyolefin resin; and an adhesive layer, disposed between a surface of the substrate sheet and one of the coating layers formed on the surface of the substrate sheet, comprising a member of selected from the group consisting of hydroxyethyl cellulose and mixtures of hydroxyethyl cellulose and at least one organic compound having carboxyl groups, said adhesive layer enabling the peel strength between the substrate sheet surface and the coating layer to be controlled to a peel strength of 10 to 200 g/25.4 mm determined in accordance with ASTM D903-49.

2. The support sheet as claimed in claim 1, wherein the hydroxyethyl cellulose in the adhesive layer has a degree of substitution of the hydroxyethyl groups of 1.0 to 1.5 on each glucose unit and an average gram molecule of the substituted hydroxyethyl groups of 1.5 to 2.5.

3. The support sheet as claimed in claim 1, wherein the hydroxyethyl cellulose in the adhesive layer has a molecular weight of 30,000 to 250,000.

4. The support sheet as claimed in claim 1, wherein the adhesive layer contains 95% by weight or more of hydroxyethyl cellulose or the mixture of hydroxyethyl cellulose and at least one organic compound having carboxyl groups.

5. The support sheet as claimed in claim 1, wherein the carboxyl groups-having organic compound is selected from carboxy-modified polyvinyl alcohols, carboxy-modified styrene-butadiene copolymers, carboxy-modified acrylic acid polymers, carboxy-modified acrylic ester polymers and oxidized starch.

6. The support sheet as claimed in claim 5, wherein the carboxy-modified polyvinyl alcohol contains 1 to 20 molar % of carboxyl groups and has a molecular weight of 40,000 to 130,000.

7. The support sheet as claimed in claim 1, wherein the mixing ratio in weight of hydroxyethyl cellulose to the carboxyl groups-having organic compound is in the range of from 2:8 to 8:2.

8. The support sheet as claimed in claim 1, wherein the adhesive layer is in an amount of 0.05 to 5 $g/m^2$.

9. The support sheet as claimed in claim 1, wherein the substrate sheet consists of a paper sheet having a weight of 50 to 250 $g/m^2$.

10. The support sheet as claimed in claim 1, wherein the polyolefin resin in the coating layer is selected from the group consisting of low density polyethylene resins, high density polyethylene resins and mixtures thereof.

11. The support sheet as claimed in claim 1, wherein the polyolefin in the coating layer has a molecular weight of 20,000 to 200,000.

12. The support sheet as claimed in claim 1, wherein the coating layer has a weight of 10 to 50 $g/m^2$.

13. The support sheet as claimed in claim 1, wherein the adhesive layer is formed between a surface of the substrate sheet and the coating layer on which a photographic emulsion layer will be formed.

14. A support sheet for photographic paper comprising a substrate comprising a paper sheet; an adhesive layer disposed on one surface of said substrate and comprising hydroxy ethyl cellulose; and a coating layer comprising a polyolefin resin disposed on both sides of said substrate; wherein said adhesive layer has such a composition and is present in such amount that the peel strength between said substrate and the coating layer separated therefrom by said adhesive is 10 to 200 g/25.4 mm. as determined by ASTM D903-49.

* * * * *